(12) United States Patent
Jung et al.

(10) Patent No.: US 9,441,182 B2
(45) Date of Patent: Sep. 13, 2016

(54) WEAR-RESISTANT ANTIFRICTION LACQUER FOR COATING ENGINE PISTONS

(75) Inventors: Christian Jung, Oberhaid (DE); Jurgen Reitenspies, Altdorf (DE)

(73) Assignee: Federal-Mogul Nurnberg GmbH, Nuremberg (DE)

(*) Notice: Subject to any disclaimer, the term of this patent is extended or adjusted under 35 U.S.C. 154(b) by 523 days.

(21) Appl. No.: 13/318,193

(22) PCT Filed: Apr. 27, 2010

(86) PCT No.: PCT/EP2010/055619
§ 371 (c)(1),
(2), (4) Date: Jan. 16, 2012

(87) PCT Pub. No.: WO2010/125060
PCT Pub. Date: Nov. 4, 2010

(65) Prior Publication Data
US 2012/0103183 A1    May 3, 2012

(30) Foreign Application Priority Data
Apr. 29, 2009   (DE) .................. 10 2009 002 716

(51) Int. Cl.
*F15B 1/08*    (2006.01)
*C10M 169/04*  (2006.01)
*C09D 161/06*  (2006.01)

(52) U.S. Cl.
CPC .......... *C10M 169/04* (2013.01); *C09D 161/06* (2013.01); *C10M 2201/041* (2013.01); *C10M 2201/061* (2013.01); *C10M 2201/062* (2013.01); *C10M 2201/066* (2013.01); *C10M 2209/101* (2013.01); *C10M 2213/062* (2013.01); *C10N 2230/06* (2013.01); *C10N 2240/10* (2013.01); *C10N 2250/121* (2013.01)

(58) Field of Classification Search
CPC ............... F16J 1/02; F15B 1/04; F15B 1/08; C09D 161/06
USPC .................................................. 92/155, 223
See application file for complete search history.

(56) References Cited

U.S. PATENT DOCUMENTS

| | | | |
|---|---|---|---|
| 3,674,689 A * | 7/1972 | Giltrow et al. ............ | 428/298.7 |
| 5,231,959 A * | 8/1993 | Smietana ................... | 123/90.12 |
| 5,486,299 A * | 1/1996 | Fuwa et al. ................. | 508/106 |
| 2009/0312206 A1* | 12/2009 | Miyasaka ..................... | 508/154 |

FOREIGN PATENT DOCUMENTS

| | | |
|---|---|---|
| CN | 1862044 A | 11/2006 |
| DE | 1933369 A1 | 1/1971 |

(Continued)

OTHER PUBLICATIONS

I.L. Knunjanz "Chemical Encyclopedia" "Great Russian Encyclopedia", M., 1998, vol. 1, cols. 576-577, 821.

*Primary Examiner* — Nathaniel Wiehe
*Assistant Examiner* — Abiy Teka
(74) *Attorney, Agent, or Firm* — Robert L. Stearns; Dickinson Wright, PLLC

(57) ABSTRACT

A piston coating is described that comprises a phenolic resin, at least one solid lubricant selected from among the group including graphite, $MoS_2$, $WS_2$, BN, and PTFE, as well as carbon fibers. Said coating has an advantageous wear resistance and an advantageous coefficient of friction.

16 Claims, 1 Drawing Sheet

(56) References Cited

FOREIGN PATENT DOCUMENTS

| DE | 2914987 | A1 | 10/1980 |
| --- | --- | --- | --- |
| DE | 4343439 | | 12/1993 |
| DE | 10329228 | A1 | 6/2003 |
| DE | 69908869 | T2 | 5/2004 |
| DE | 102005026664 | | 6/2005 |
| DE | 102005050428 | A1 | 4/2007 |
| DE | 102005059613 | A1 | 6/2007 |
| EP | 0976795 | A2 | 7/1999 |
| EP | 1469050 | A1 * | 10/2004 ........... C09D 179/08 |
| GB | 1252708 | A * | 6/1970 ............... B44D 1/02 |
| JP | S57168042 | A | 10/1982 |
| JP | H06016968 | A | 1/1994 |
| JP | H06065395 | A | 3/1994 |
| JP | H10122040 | A | 5/1998 |
| RU | 2004582 | C1 | 12/1993 |
| RU | 2307130 | C1 | 9/2007 |
| SU | 1654306 | A1 | 6/1991 |
| WO | WO2008086394 | A1 | 7/2008 |

* cited by examiner

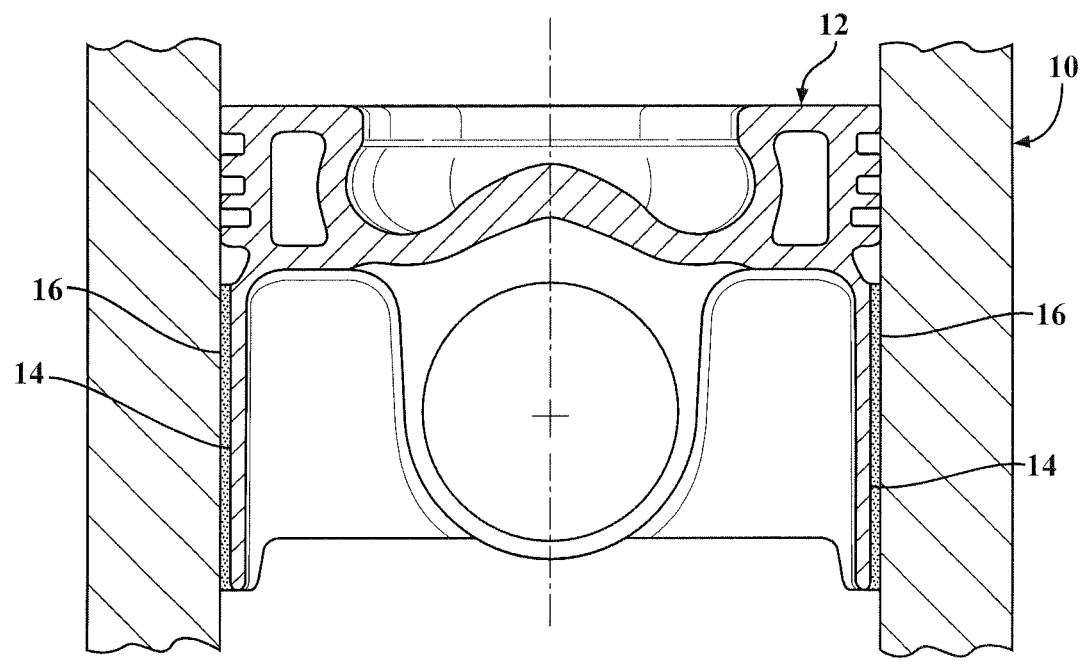

WEAR-RESISTANT ANTIFRICTION LACQUER FOR COATING ENGINE PISTONS

BACKGROUND OF THE INVENTION

1. Technical Field

The invention relates to a coating for pistons, in particular a coating for the piston skirt of an internal combustion engine.

2. Related Art

Coatings for the piston shaft, also referred to as the piston skirt, should exhibit a high wear resistance with at the same time a low coefficient of friction. In particular, a high durability and wear resistance is required in engine operating states subject to a high degree of wear, such as repeated cold starts. In this connection, depletion of the coating in the load-bearing regions of the piston shaft should above all be avoided.

Various coatings for pistons of internal combustion engines are known in the prior art.

For example, U.S. Pat. No. 5,486,299 describes a lubricant composition for coating the surface of pistons and/or cylinders of engines that use alcohol or non-petroleum based products as fuel. This lubricant composition comprises a mixture of graphite, MoS2 and PTFE in a matrix of a polyamide imide resin (PAI resin).

EP 1 469 050 A1 describes a coating composition for pistons, which is obtained by mixing uncured polyamide imide (PAI) with a solid lubricant such as PTFE, titanium oxide powder and a silane coupling agent.

DE 10 2005 026 664 A1 also describes a coating for a piston based on a PAI lacquer. This coating is PTFE-free and contains 5-15 wt. % zinc sulphide, 5-15 wt. % graphite or $MoS_2$ and 5-15 wt. % $TiO_2$. Both zinc sulphide and $TiO_2$, are used in the form of fine particles with a particle size of ≤0.7 μm.

De 43 43 439 A1 describes a reciprocating piston arrangement, which comprises a piston with a piston skirt formed in the manner of a relief with webs, which are coated with a solid lubricant of graphite, $MoS_2$ and BN in an epoxy resin.

EP 0 976 795 A2 describes a corrosion protection lubricant for hinges and the like, which contains as lubricant a mixture of phenolic resin, epoxy resin, polyvinyl butyral resin and polyolefin wax. The coating also contains aluminium particles, zinc particles or a metal phosphate as corrosion inhibitor, and a solvent.

DE 103 29 228 A1 describes a polymer composite material for slide bearings with a polymer matrix that can, for example, consist of epoxy resin or PEEK. A filler material and nanoscale particles are embedded in this polymer matrix. Aramide fibers, glass fibers, carbon fibers, glass spheres, PTFE, graphite and silicones can be used as filler material. The nanoscale particles can be formed by $TiO_2$, $Al_2O_3$, MgO, $ZeO_2$, SiC, $Si_3N_4$, BN, glasses and hard solid metallic materials.

SUMMARY OF THE INVENTION

A coating composition is provided for a piston, which exhibits an improved wear resistance and minimises frictional losses in the engine.

Surprisingly, it has been found that such formulations provide low-friction, wear-resistant and extremely adherent piston coatings, in particular piston skirt coatings, the properties of which are as good as or are even superior to the systems of the prior art.

The composition comprises a thermally curable phenolic resin. Thermally curable phenolic resins, so-called resols, can in contrast to novolaks cross-link via hydroxyl groups. Phenolic resins with a mean molecular weight of 500-1500 g/mol are preferably used.

In an advantageous embodiment, the composition according to the invention also contains an epoxy resin. The addition of epoxy resins generally improves the adhesion of the layers to metallic surfaces as well as their flexibility. To this end, epoxy resins based on bisphenol A with a molecular weight of 2000-4000 g/mol and an epoxy equivalent >700 g/mol are preferably used.

In the context of the invention these resins are preferably used as a solution in a solvent. The choice of solvent is essentially governed by the nature of the lacquer application and has no influence on the properties of the cured coating. The coating of pistons is often carried out in screen priming processes. For this application, it is particularly solvents with a high boiling point that are preferred. Suitable solvents include, for example, butyl glycol acetate, ethyl glycol acetate, dipropylene glycol, dipropylene glycol butyl ether and butoxyethanol.

The phenolic resin and optionally the epoxy resin may alternatively also be used as a water-dilutable dispersion.

Graphite, $MoS_2$, $WS_2$, BN and/or PTFE are added as solid lubricants to the composition. In this connection, grades generally known to the person skilled in the art can be used as solid lubricants. Graphite with a mean grain size of 1-100 μm, particularly preferably 5-50 μm, is preferably used. Molybdenum disulphide is preferably used with a mean grain size of 0.1-50 μm, particularly preferably 0.1-10 μm. Boron nitride in the hexagonal modification is preferably used with a mean grain size in the range from 1 to 100 μm, particularly preferably in the range from 1 to 20 μm. Polytetrafluoroethylene (PTFE) raw materials are preferably used with a mean grain size of 1-100 μm, particularly preferably 1-20 μm.

If graphite is used as the solid lubricant, then this is preferably used in an amount of 2-8 wt. % based on the total composition.

If $MoS_2$ is used as the solid lubricant, then this is preferably used in an amount of 10-20 wt. % based on the total composition.

The grain size of the aforementioned solid lubricants can be determined by means of light scattering measurements in a manner known to the person skilled in the art.

In addition the composition according to the invention contains carbon fibers. These are preferably used in an amount of 2-10 wt. %, in particular 2-8 wt. %, based on the total composition. Carbon fibers are preferred with a mean fibre thickness of ≤100 μm, preferably 1-10 μm, and also with a mean fibre length of ≤1000 μm, preferably 10-500 μm. The composition according to the invention can also contain so-called carbon nanofibers, the mean fibre thickness of which, in contrast to conventional carbon fibers, is less than 1 μm, preferably in a range from 10 to 500 nm. In this connection, the thickness and the length of conventional carbon fibers are measured with a light microscope. With carbon nanofibers, the thickness and the length can be determined by means of scanning electron microscopy.

In addition to the components mentioned above, the composition can also contain additives and auxiliary substances, such as flow-control additives, anti-foaming agents, wetting agents, dispersing aids or rheological additives.

BRIEF DESCRIPTION OF THE DRAWINGS

FIG. 1 is a cross-sectional view of a portion of an internal combustion engine 10 and a piston 12 comprising a skirt 14 with a coating 16, wherein the piston 12 is disposed in the internal combustion engine 10, according to one exemplary embodiment of the invention.

DETAILED DESCRIPTION

Particularly preferred embodiments of the coating compositions according to the invention are shown in the following Table (amounts given in g/100 g of the total formulation; amount of the resins referred to the solids content):

| g/100 g | A1 | A2 | A3 | A4 | A5 | A6 | A7 |
|---|---|---|---|---|---|---|---|
| Phenolic resin | 15-25 | 15-25 | 15-25 | 15-25 | 25-30 | 25-30 | 10-15 |
| Epoxy resin | 10-15 | 10-15 | 10-15 | 10-15 | | | 15-25 |
| Graphite | 9-14 | | | | | | 6-8 |
| $MoS_2$ | | 9-14 | | | 12-16 | 12-16 | |
| BN | | | 9-14 | | | | |
| PTFE | | | | 9-14 | | | 6-8 |
| C fibers | 6-8 | 6-8 | 6-8 | 6-8 | 7-9 | 7-9 | 6-8 |
| C nanofibers | | | | | | | |
| $Al_2O_3$ | | | | | | 1-2 | |
| $TiO_2$ | | | | | | | |
| Solvent/additives | 38-60 | 38-60 | 38-60 | 38-60 | 45-56 | 43-55 | 36-57 |

| g/100 g | A8 | A9 | A10 | A11 |
|---|---|---|---|---|
| Phenolic resin | 10-15 | 10-15 | 10-15 | 10-15 |
| Epoxy resin | 15-25 | 15-25 | 15-25 | 15-25 |
| Graphite | 4-6 | 4-6 | 4-6 | 9-14 |
| $MoS_2$ | 12-18 | 12-18 | 12-18 | |
| BN | | | | |
| PTFE | | | | |
| C fibers | 4-6 | 4-6 | | 6-8 |
| C nanofibers | | | 3-5 | |
| $Al_2O_3$ | | | | |
| $TiO_2$ | | 6-8 | | |
| Solvent/additives | 30-55 | 22-49 | 31-56 | 38-60 |

$Al_2O_3$: Dispersion of ceramic aluminium oxide nanoparticles
$TiO_2$: Dispersion of titanium dioxide (rutile); fineness < 5 μm The invention is described in more detail hereinafter with the aid of examples, which should not be regarded as restricting the subject matter of the invention.

EXAMPLES

All amounts are given in wt. % referred to the total formulation. The amount of the resins refers to the solids content. The amount of the additives and auxiliary substances refers to the as-supplied form.

| | B1 | B2 | B3 | B4 | B5 | B6 | B7 |
|---|---|---|---|---|---|---|---|
| Phenolic resin | 20 | 20 | 20 | 20 | 26 | 26 | 12 |
| Epoxy resin | 13 | 13 | 13 | 13 | | | 19 |
| PAI | | | | | | | |
| Graphite | 11 | | | | | | 7 |
| $MoS_2$ | | 11 | | | 14 | 14 | |
| BN | | | 11 | | | | |
| PTFE | | | | 11 | | | 7 |
| C fibers | 7 | 7 | 7 | 7 | 8 | 8 | 7 |
| C nanofibers | | | | | | | |
| $Al_2O_3$ | | | | | | 1.5 | |
| $TiO_2$ | | | | | | | |
| Solvent/additives | 49 | 49 | 49 | 49 | 52 | 50.5 | 48 |
| Solids content | 51 | 51 | 51 | 51 | 48 | 49.5 | 52 |

| | B8 | B9 | B10 | B11 | V1 | V2 |
|---|---|---|---|---|---|---|
| Phenolic resin | 12 | 12 | 12 | 13 | 12 | |
| Epoxy resin | 19 | 19 | 19 | 19 | 19 | |
| PAI | | | | | | 30 |
| Graphite | 4 | 4 | 4 | 11 | 18 | 15 |
| $MoS_2$ | 14 | 14 | 14 | | | |
| BN | | | | | | |
| PTFE | | | | | | |
| C fibers | 5 | 4 | | 6 | | 7 |
| C nanofibers | | | 5 | | | |
| $Al_2O_3$ | | | | | | |
| $TiO_2$ | | 6 | | | | |
| Solvent/additives | 46 | 41 | 46 | 51 | 51 | 48 |
| Solids content | 54 | 59 | 54 | 49 | 49 | 52 |

PAI: Thermally curable polyamide imide resin
$Al_2O_3$: Dispersion of ceramic aluminium oxide nanoparticles
$TiO_2$: Dispersion of titanium dioxide (rutile); fineness < 5 μm The tribological properties of the layers were investigated with a Cameron Flint TE-77 Tribotester (frictional wear test). For this purpose, aluminium samples were coated with the lacquer formulations according to the invention and the coefficient of friction of the layers paired with cast iron as counter-piece was measured. The measurements were carried out under a load of 150 N and at a vibration frequency of 25 Hz in the unoiled state.

Apart from the coefficient of friction, the wear resistance of the layers under engine operating conditions is of particular importance. For this purpose, corresponding pistons were subjected to a wear test on an engine test bench. This consisted of 50 successive cold starts at −10° C. in a conventional four-cylinder petrol engine. The wear of the anti-friction lacquer coating on the piston shaft was visually assessed after this test and awarded a score of 1 to 5. A score of 1 denotes no visible layer wear, while a score of 5 denotes a high degree of wear down to the material of the piston over the whole load-bearing region of the piston shaft.

| | B1 | B2 | B3 | B4 | B5 | B6 | B7 |
|---|---|---|---|---|---|---|---|
| Coefficient of friction | 0.14 | 0.14 | 0.18 | 0.17 | 0.12 | 0.13 | 0.17 |
| Wear evaluation* | 2 | 2 | 3 | 3 | 1 | 2 | 2 |

| | B8 | B9 | B10 | B11 | V1 | V2 |
|---|---|---|---|---|---|---|
| Coefficient of friction | 0.14 | 0.15 | 0.17 | 0.14 | 0.19 | 0.24 |
| Wear evaluation* | 2 | 2 | 2 | 2 | 4 | 3 |

*Evaluation: 1: low wear, . . . 5: high wear

The invention claimed is:

1. A piston comprising a coating made from a coating composition which comprises:
   a phenolic resin in an amount of 15-25 wt. %, based on the total weight of the coating composition;
   at least one solid lubricant in an amount of 9-14 wt. %, based on the total weight of the coating composition, the at least one solid lubricant selected from the group consisting of graphite, $MoS_2$, $WS_2$, BN, and PTFE;
   epoxy resin in an amount of 10-15 wt. %, based on the total weight of the coating composition; and
   carbon fibers in an amount of 2-10 wt. %, based on the total weight of the coating composition.

2. The piston according to claim 1, wherein said carbon fibers have a length of 10-500 μm.

3. The piston according to claim 1, wherein the coating composition further contains a flow-control additive, an anti-foaming additive, a wetting agent, a dispersing aid and/or a rheological additive.

4. The piston of claim 1, wherein the coating is applied to a skirt of the piston.

5. The piston of claim 1, wherein the piston is an internal combustion engine piston.

6. The piston of claim 1, wherein the coating composition includes the phenolic resin in an amount 20 wt. %, the at least one lubricant in an amount of 11 wt. %, the carbon fibers in an amount of 7 wt. %, and the epoxy resin in an amount of 13 wt. %, based on the total weight of the coating composition.

7. The piston of claim 1, wherein the coating composition further comprises at least one solvent and/or at least one additive in a total amount of 30-60 wt. %, based on the total weight of the coating composition.

8. The piston according to claim 1, wherein the carbon fibers of the coating composition have a mean thickness of 1-10 μm and a length of ≤1000 μm.

9. The piston according to claim 8, wherein the carbon fibers of the coating composition have a length of 10-500 μm.

10. The piston of claim 1, wherein the carbon fibers of the coating composition are nanofibers having a mean thickness of less than 1 μm.

11. A piston comprising a coating made from a coating composition which comprises:

a phenolic resin in an amount of 10-15 wt. %, based on the total weight of the coating composition;

at least one solid lubricant in an amount of 9-14 wt. %, based on the total weight of the coating composition, the at least one solid lubricant selected from the group consisting of graphite, $MoS_2$, $WS_2$, BN, and PTFE;

epoxy resin in an amount of 15-25 wt. %, based on the total weight of the coating composition; and carbon fibers in an amount of 2-10 wt. %, based on the total weight of the coating composition.

12. The piston according to claim 11, wherein the carbon fibers of the coating composition have a mean thickness of 1-10 μm and a length of ≤1000 μm.

13. The piston of claim 11, wherein the carbon fibers of the coating composition are nanofibers having a mean thickness of less than 1 μm.

14. The piston of claim 11, wherein the coating is applied to a skirt of the piston.

15. The piston of claim 11, wherein the coating composition includes the phenolic resin in an amount of 12 wt. %, the at least one lubricant in an amount of 11 wt. %, the carbon fibers in an amount of 7 wt. %, and the epoxy resin in an amount of 19 wt. %, based on the total weight of the coating composition.

16. The piston of claim 11, wherein the coating composition further comprises at least one solvent and/or at least one additive in a total amount of 30-60 wt. %, based on the total weight of the coating composition.

* * * * *